(12) United States Patent
Kusano et al.

(10) Patent No.: US 8,293,164 B2
(45) Date of Patent: Oct. 23, 2012

(54) MOLDING DIE AND CONTROL METHOD THEREOF

(75) Inventors: Mitsuo Kusano, Tainai (JP); Kazuya Suzuki, Tainai (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 20 days.

(21) Appl. No.: 12/037,979

(22) Filed: Feb. 27, 2008

(65) Prior Publication Data

US 2008/0315460 A1    Dec. 25, 2008

(30) Foreign Application Priority Data

Jun. 20, 2007   (JP) ................................ 2007-162691

(51) Int. Cl.
    *B29C 35/12* (2006.01)
(52) U.S. Cl. ............. 264/403; 425/3; 425/548; 425/552
(58) Field of Classification Search .................. 264/403; 425/3, 548, 552
    See application file for complete search history.

(56) References Cited

U.S. PATENT DOCUMENTS

| | | | | |
|---|---|---|---|---|
| 3,170,010 | A * | 2/1965 | Schultz et al. .................. | 264/51 |
| 3,801,253 | A * | 4/1974 | Williams .................... | 425/324.1 |
| 4,324,541 | A * | 4/1982 | Curetti et al. ................. | 425/562 |
| 4,377,936 | A * | 3/1983 | Gram .............................. | 62/346 |
| 4,439,492 | A * | 3/1984 | Wada et al. ................... | 428/409 |
| 4,900,242 | A * | 2/1990 | Maus et al. ................... | 425/149 |
| 6,120,714 | A * | 9/2000 | Allan et al. ..................... | 264/69 |
| 6,723,185 | B1 * | 4/2004 | Elfving et al. ................ | 148/510 |
| 6,936,206 | B1 * | 8/2005 | Satoh et al. ................... | 264/255 |
| 7,484,953 | B2 * | 2/2009 | Yoshino et al. ............... | 425/547 |
| 2004/0041303 | A1 * | 3/2004 | Kim et al. ..................... | 264/320 |
| 2005/0064061 | A1 | 3/2005 | Eichlseder | |
| 2009/0053347 | A1 * | 2/2009 | Shimodo et al. .............. | 425/143 |
| 2010/0201040 | A1 | 8/2010 | Guichard et al. | |

FOREIGN PATENT DOCUMENTS

| | | |
|---|---|---|
| JP | 07-100867 | 4/1995 |
| JP | 11-57985 A | 3/1999 |
| JP | 2001-9836 A | 1/2001 |
| JP | 2005-138366 A | 6/2005 |
| JP | 2005-530629 A | 10/2005 |
| JP | 2005-335403 A | 12/2005 |
| JP | 2006-255900 A | 9/2006 |
| JP | 2007-30432 A | 2/2007 |
| JP | 2008-546570 A | 12/2008 |
| WO | WO 03/097328 A1 | 11/2003 |
| WO | WO 2006/136743 A1 | 12/2006 |

* cited by examiner

*Primary Examiner* — Joseph Del Sole
*Assistant Examiner* — David N Brown, II
(74) *Attorney, Agent, or Firm* — Miles & Stockbridge P.C.

(57) ABSTRACT

The present invention provides a molding die and a control method thereof aimed at shortening cycle time from heating to cooling of a molding cavity of the die with a simple and inexpensive configuration. In a molding die equipped with a molding cavity to mold a base material, a magnetic die material is used for the molding cavity, cooling means to feed a refrigerant is installed inside the molding cavity along a molding face and heating means by high-frequency induction is installed around the cooling means, and the molding cavity is alternately heated and cooled repeatedly by the heating means and the cooling means when the base material is molded with the molding cavity. Here, the cooling means includes a tubular body installed in the molding cavity, feeds a refrigerant when the molding cavity is cooled, and is in a hollow state of not containing the refrigerant when the molding cavity is heated.

18 Claims, 3 Drawing Sheets

UPPER DEAD CENTER

LOWER DEAD CENTER

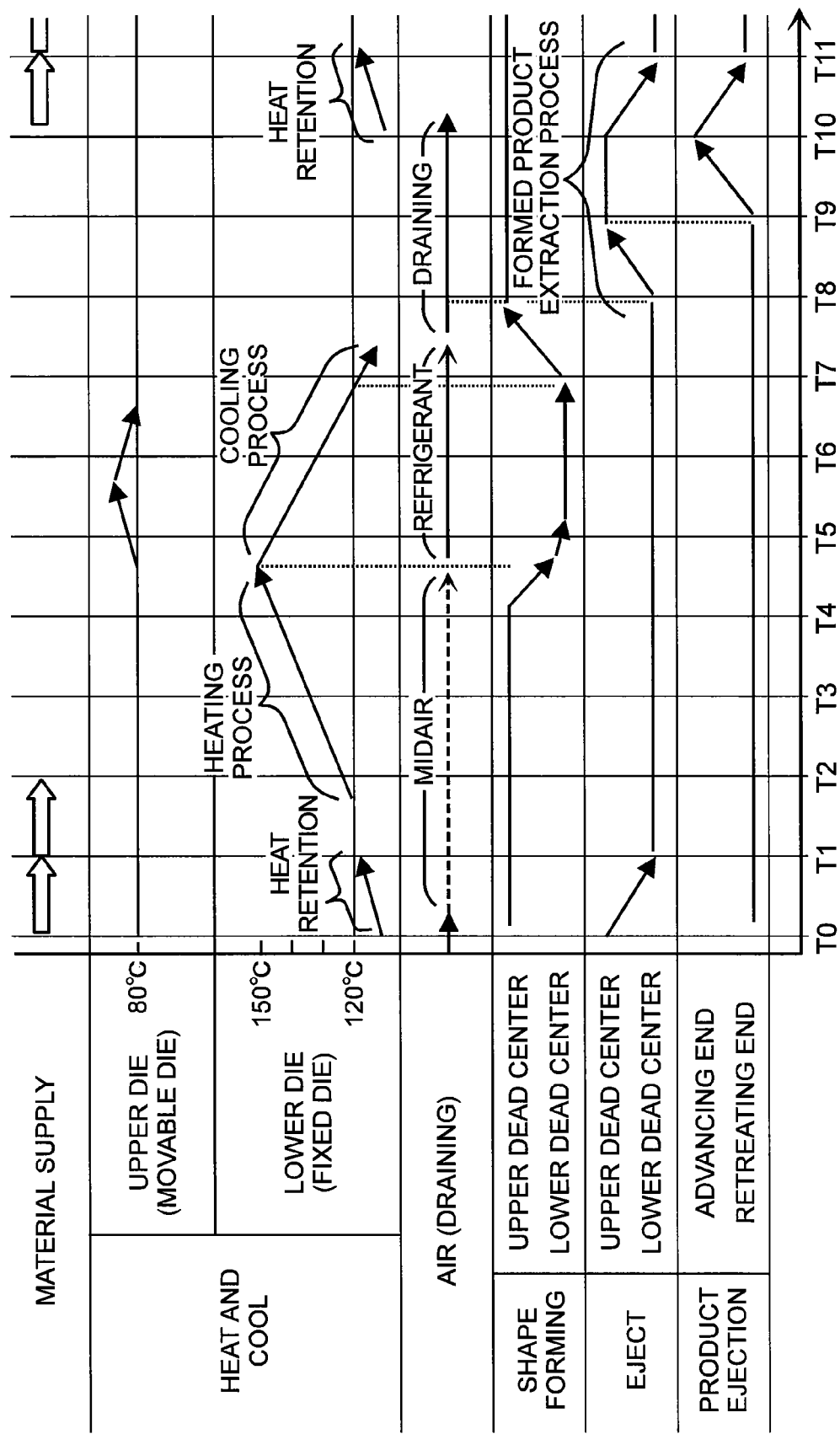

MOLDING DIE AND CONTROL METHOD THEREOF

BACKGROUND OF THE INVENTION

The present invention relates to a molding die and a control method thereof aimed at shortening cycle time from heating of a base material at molding to cooling of a molded product at solidifying.

In the case of the production of a large number of highly precise molded products, if a multicavity structure die is used, the size of the die increases, thus the thermal capacity increases, a long time is required for up and down of the die temperature and thus the cycle time increases, and the productivity is impaired. Further, pitch error is generated on the fixed and movable sides due to the difference of the thermal expansion in the transverse direction caused by the difference in the temperature of the die between the fixed side and the movable side, the concentricity between the center portion and the periphery of a molded product is not satisfied, and hence there are problems in quality. The difference in wall thickness between the right wall and the left wall of a cylindrical molded product 2 caused by pitch error is shown in FIG. 2(b).

A possible measure to solve the problem is to use a die of a single-cavity structure. The measure however causes another problem such as maladaptation to massive production, and another possible measure to solve the problem is to shorten the molding cycle time.

A die that can shorten the time required to heat and cool the die and thereby shorten the cycle time of molding is disclosed in JP-A-2001-009836. Further, a die that can be rapidly heated and cooled by using a heat pipe as a heat transfer medium is disclosed in JP-A-2005-138366.

In JP-A-2001-009836, a die that realizes a short molding cycle time by configuring the die so as to be able to uniformly heat and cool the whole wall of the cavity of the die for a short period of time is shown. However, since heating means is installed inside (on the wall side of) the cavity and cooling means is installed on the outer side thereof, cooling heat is transferred to the cavity wall from outside through the heating means (a tubular member, an encapsulated heat medium, and a shell part 20) at the time of cooling, thus the thermal capacity increases at the time of cooling, a large cooling heat quantity is required, and short time cooling is hardly realized. Further, in general the control of cooling is more difficult than the case of heating and the outward installation of the cooling means makes the cooling control of the cavity wall more difficult. In addition, another drawback is that a heat pipe for heating is expensive.

A die that makes it possible to rapidly heat and cool a molded product via a heat transfer column by installing the heat transfer column such as a heat pipe the front end of which comes close to the face of the die touching the molded product and further installing a heat source (for heating and cooling) capable of temperature adjustment at the rear end of the heat transfer column is shown in JP-A-2005-138366. However, since heat is transferred to the molded product via the heat transfer column, the thermal capacity corresponding to that of the heat transfer column (including the inside refrigerant in the case of a heat pipe) increases, a large quantity of heat is required at the time of heating and cooling, and the rapidness in heating and cooling of the molded product is hindered to that extent. Further, when a heat pipe is used for the heat transfer column, the speed of heat transfer increases but the drawback here is that the heat pipe is expensive.

SUMMARY OF THE INVENTION

The present invention, in view of the above conventional examples, provides a molding die and a control method thereof aimed at shortening cycle time from heating to cooling of a molding cavity (a molding tool) of the die with a simple and inexpensive configuration.

According to an aspect of the present invention, in a molding die equipped with a molding cavity to mold a base material: a magnetic die material is used for the molding cavity; cooling means to feed a refrigerant is installed inside the molding cavity along the molding face and heating means by high-frequency induction is installed around the cooling means; and the molding cavity is alternately heated and cooled repeatedly by the heating means and the cooling means when the base material is molded with the molding cavity. Here, the cooling means: includes a tubular body installed in the molding cavity; feeds a refrigerant when the molding cavity is cooled; and is in a hollow state of not containing the refrigerant when the molding cavity is heated.

According to another aspect of the present invention, in a method for controlling a molding die by installing cooling means to feed a refrigerant inside a molding cavity to mold a base material along the molding face, installing heating means around the cooling means, and repeating a heating process and a cooling process of the molding cavity alternately by the heating means and the cooling means when the base material is molded, the cooling means is in the state of feeding the refrigerant in the cooling process and in a hollow state of not containing the refrigerant in the heating process. Here, a molded product extraction process is further provided between the cooling process and the heating process, the cooling means is in the state of feeding the refrigerant in the cooling process, the refrigerant is evacuated from the cooling means in the molded product extraction process, and thus the cooling means is in a hollow state of not containing the refrigerant in the heating process.

BRIEF DESCRIPTION OF THE DRAWINGS

FIG. 4 is an operational explanatory chart showing the operations of sections in an embodiment according to the present invention.

DETAILED DESCRIPTION OF THE PREFERRED EMBODIMENTS

Figure 1A:
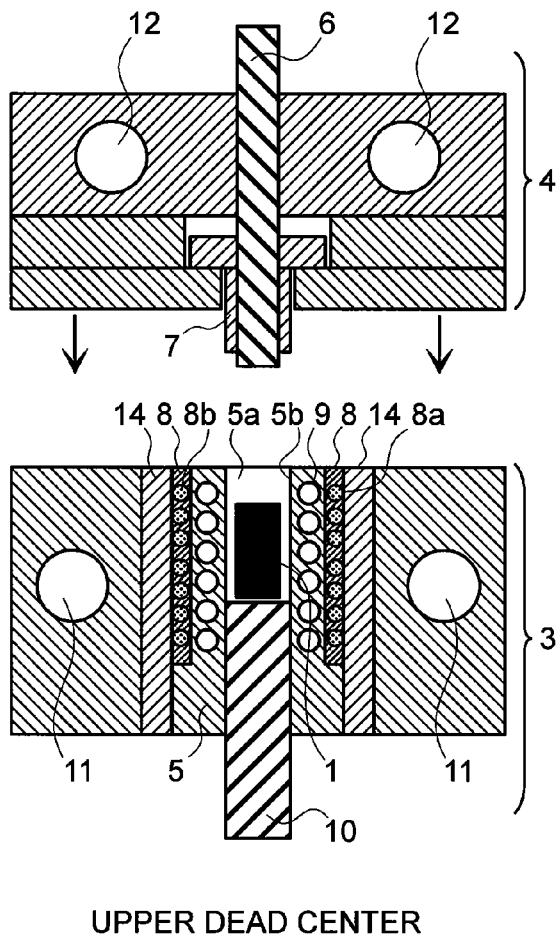
FIGS. 1(a) and 1(b) are sectional views showing an embodiment having a single-cavity structure to produce one molded product according to the present invention.
Figure 1B:
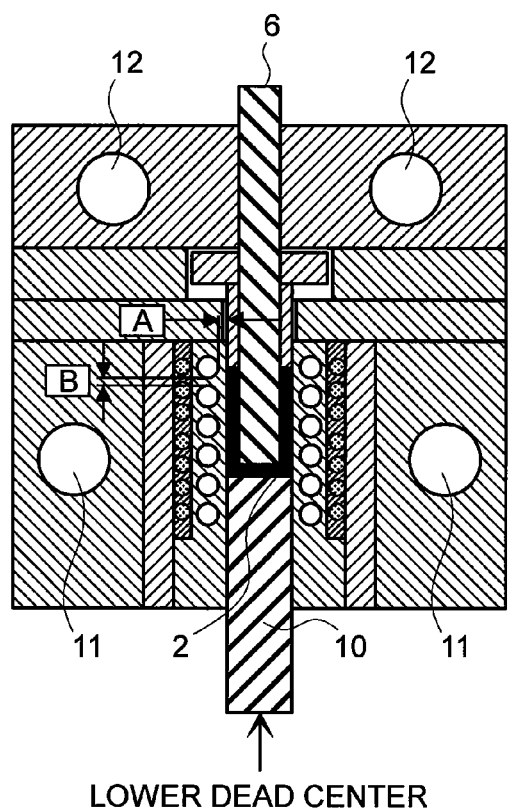

Embodiments of are hereunder explained in reference to drawings. FIGS. 1(a) and 1(b) are sectional views showing an embodiment having a single-cavity structure to produce one molded product according to the present invention. FIGS. 1(a) and 1(b) show the upper dead center and the lower dead center of a movable die respectively. The reference numeral 1 denotes a columnar base material to be molded, 2 a molded product (a closed end cylinder) formed by molding the base material 1, 3 a fixed die (a lower die) for molding into which the base material is inserted, and 4 a movable die (an upper die) that is disposed above the fixed die 3, moves between the upper dead center and the lower dead center, and molds the base material 1.

The fixed die 3 is provided with a cylindrical molding cavity (a cylindrical molding tool) 5 having a hole 5a in the center thereof. The molding cavity 5 is a die part for the compression molding of a base material, is made of a magnetic metal (iron or the like) having a good thermal conductivity and being heated by high-frequency induction, and is formed light and small in order to reduce the thermal capacity to the utmost extent. An inner punch 6 that descends in the molding cavity 5 and applies compression molding to the base material 1 is attached to the movable die 4 in a downward protruding manner and an outer punch 7 to decide the height of the base material 1 subjected to compression molding is also attached.

The reference numeral 9 denotes cooling means embedded close to the molding face 5b in the molding cavity 5 and the cooling means includes a tubular body in which a refrigerant such as cold water flows. Here, the distance A between the tubular body of the cooling means 9 and the molding face 5b is set so as to be nearly equal to the pitch B of the tubular body in the vertical direction in order to avoid temperature variation on the molding face 5b at the time of cooling. A refrigerant (cold water) flows in the tubular body of the cooling means 9 at the time of cooling and, when a molded product is discharged (this will be described later), the cold water is drained and evacuated by air blowing and a hollow state is formed and maintained at the time of heating.

The reference numeral 8 denotes heating means disposed around the cooling means and configured by winding a high-frequency induction heating coil 8a around the cooling means in the state of embedded in an insulator 8b. The high-frequency induction heating has a large thermal capability and is easy to control and hence is placed outside the cooling means. The reference numeral 10 denotes an ejector pin to: push up a molded product 2 molded, cooled, and thereafter solidified from the molding cavity 5; move in the upward direction indicated with an arrow; and thereby eject the molded product 2 from the hole 5a.

The reference numeral 11 denotes a fixed side warmer to keep the whole fixed die 3 at 120° C. and 12 denotes a movable side warmer to keep the whole movable die 4 at 80° C. Consequently, during molding operation, the molding cavity 5, together with the fixed die 3, is kept warm at 120° C. and the movable die 4 is kept warm at 80° C. The reference numeral 14 denotes a heat-insulating panel disposed around the circumference of the molding cavity 5 and the heat-insulating panel thermally separates the molding cavity 5 from the fixed die 3 and thus reduces the thermal capacity of the molding cavity 5 to the utmost extent. Here, since the fixed mold 3 is always kept at 120° C., the molding cavity 5 is also kept at a temperature of the same level by air transmission or the like.

Such a die as described above has a simple structure and, is inexpensive, and has an improved maintainability.

Figure 3:
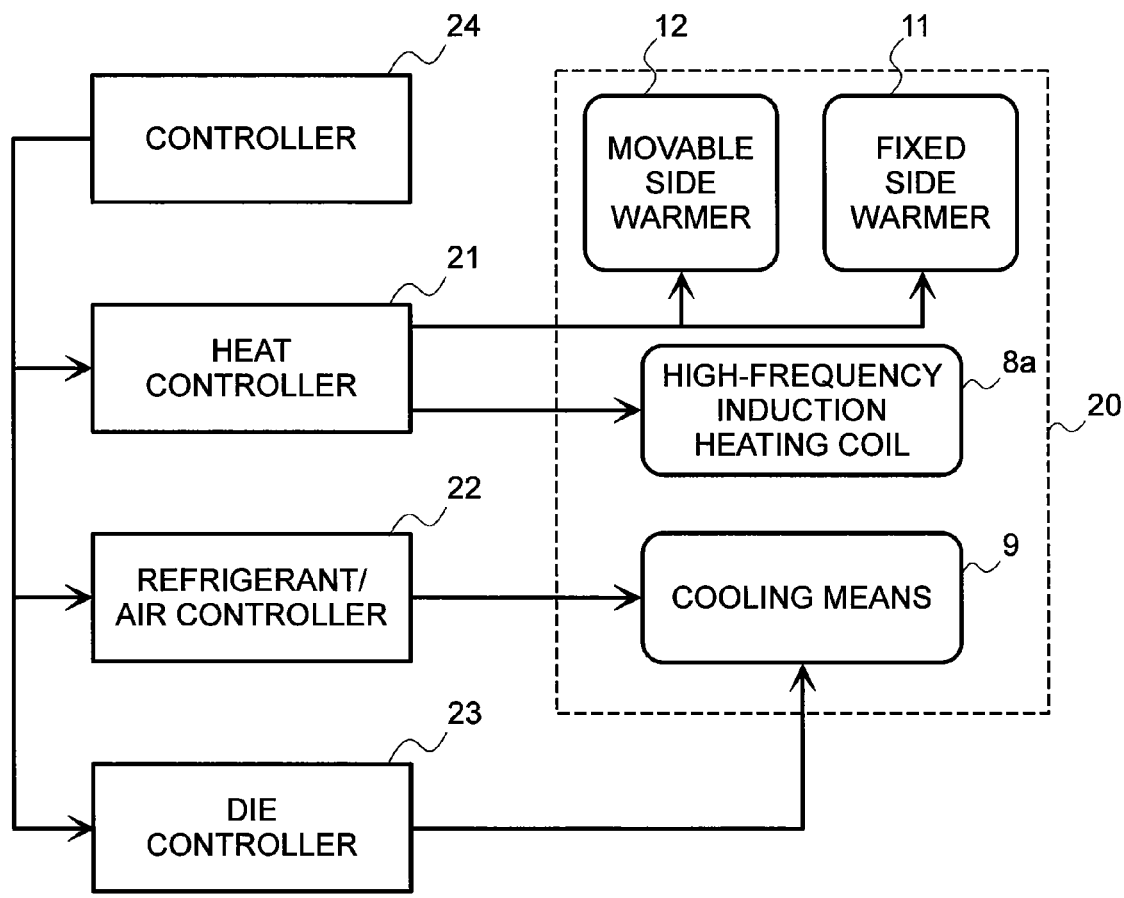
FIG. 3 is a block configuration diagram of an embodiment according to the present invention.

A control block diagram is shown in FIG. 3. The reference numeral 20 denotes a die control mechanism including the drive mechanism of both the movable and fixed dies 3 and 4, and 21 denotes a heat controller to control a fixed side warmer 11, a movable side warmer 12, and a high-frequency induction heating coil 8a. Here, the heat controller 21 drives the high-frequency induction heating coil 8a at a frequency of about 25 kHz. The reference numeral 22 denotes a refrigerant/air controller to feed a refrigerant and air to the tubular body of the cooling means 9, 23 a die controller to control the operation of the die control mechanism 20, and 24 a controller to control those controllers.

The operations of a molding die are explained in the above configuration in reference to FIGS. 1(a), 1(b) and 4. In FIG. 1(a), the base material 1 is inserted into the hole 5a of the molding cavity 5 (base material supply in FIG. 4) and at the same time heating of the molding cavity 5 in the fixed die 3 is started (T1 to T2 in FIG. 4). The heating is based on high-frequency induction heating and thus the whole molding cavity 5 including the surface thereof is directly heated by eddy current generated in the vicinity of the surface of the molding cavity 5 made of a magnetic material inside the heating coil 8a. Consequently the molding face 5b of the molding cavity 5, namely the surface touching the base material 1, is directly heated and hence heat can be transferred to the base material 1 with a high efficiency.

On this occasion, the tubular body of the cooling means 9 is drained by the air-blowing of the refrigerant (cold water) with the refrigerant/air controller 22 and is in the state of hollow and thus the thermal capacity of the molding cavity 5 is small and hence, together with the aforementioned high-efficiency heat transfer, the time required for the temperature rise of 30° C., from 120° C. to 150° C., is largely shortened (the heating process T1 to T4 in FIG. 4). According to an example, the temperature could reach 150° C. from 120° C. for 2 to 3 seconds.

Figure 2A:
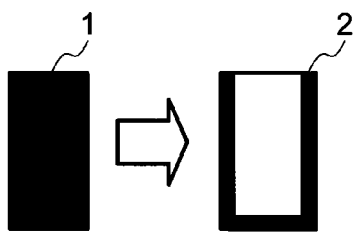
FIGS. 2(a) and 2(b) are views explaining base materials and molded products of an embodiment according to the present invention and a conventional example respectively.
Figure 2B:
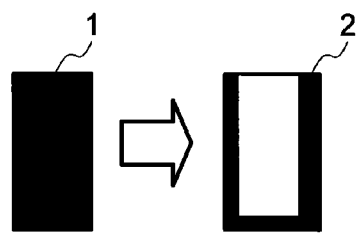

When the base material 1 is in the state of being heated to 150° C. at the timing of T4 in FIG. 4, the movable die 4 descends in the direction indicated with the arrow, reaches the lower dead center as shown in FIG. 1(b), applies compression molding to the base material 1 with the inner punch 6, and specifies the height of the molded product 2 with the outer punch 7 (T4 and T5 in FIG. 4). The state of the base material 1 and the molded product 2 is shown in FIG. 2(a).

At the molding timing of T4 to T5, the heating operation of the heating means 8 is stopped and switched to the cooling operation of the cooling means 9 in parallel.

Cold water at 4° C. is supplied to the tubular body of the cooling means 9 as the refrigerant and, since the tubular body is embedded close to the molding face 5b of the molding cavity 5, the cooling starts from the inside of the molding face 5b of the molding cavity 5 and spreads all over the molding cavity (the cooling process T5 to T7 in FIG. 4). The molding cavity 5 is cooled from 150° C. to 120° C. by 30° C. through the cooling and, since the thermal capacity of the molding cavity is small and moreover the molding cavity is cooled from the inside, the molded product 2 is cooled with a high efficiency and the temperature can be lowered for a short period of time. According to an example, the temperature could be lowered by 30° C. for about 3 seconds when cold water of 4° C. was used as the refrigerant.

When the molded product 2 hardens by the cooling, the movable die 4 ascends and returns to the upper dead center as shown in FIG. 1(a), successively the ejector pin 10 moves in the direction of the upward arrow (T8 to T9 in FIG. 4), the molded product 2 is pushed upward from the hole 5a (T9 to T10 in FIG. 4) and is discharged outside the die by a mechanism not shown in the figure (T10 in FIG. 4). The timing of T8 to T10 constitutes the molded product extraction process.

In nearly parallel with the timing of T8 to T10 as the molded product extraction process, the refrigerant in the cooling means 9 is drained. More specifically, the cold water is drained and evacuated by blowing air in the tubular body of the cooling means 9 by the control of the refrigerant/air controller 22 and the interior of the tubular body is in a hollow state. After the draining, a succeeding base material 1 is supplied to the molding cavity 5 and is ready for the succeeding heating process. The draining also has the effect of preventing the danger that the cold water in the interior is in the state of being heated by the retained heat and boils in the succeeding heating process.

One cycle of molding process is composed of the above timing T1 to T11 and the molding cycle time can be shortened by accelerating heating and cooling. Further, the die moves simply in the vertical direction and thus the molding operation and the maintainability improve and the die is easy to handle.

By the present invention, since cooling means that is relatively hardly controllable is disposed inside a molding cavity and heating means that is easily controllable is disposed outside the cooling means, the control for the shortening of the cooling and heating cycle time of the molding cavity is facilitated. Here, since the cooling means is in a hollow state not containing a refrigerant at the time of heating, the thermal capacity reduces and the heating time is shortened. Further, since heating means by high-frequency induction is used, the surface of a molding cavity touching the base material is directly heated by eddy current generated in the vicinity of the surface and hence the heating time is considerably shortened. Moreover, since the die can take an inexpensive and simple structure, the molding operation and the maintainability improve and the die is easy to handle. Furthermore, since the thermal capacity of the die reduces, electric power consumption reduces and energy can be saved.

What is claimed is:

1. A molding apparatus comprising:
   a molding die equipped with a molding cavity and an inner punch descending into the cavity to apply compression molding to a base material pre-fed into the molding cavity, a magnetic die material being used for the molding cavity;
   a cooling device, including a tubular body, disposed inside the molding cavity, to feed a refrigerant along a molding face;
   a heating device for heating by high-frequency induction disposed around the cooling device; and
   a control system which controls the cooling device, the heating device, and the molding die,
   wherein the control system is configured to coordinate heating and cooling of the molding cavity with movement of a portion of the molding die and the inner punch such that:
     the refrigerant is fed in the cooling device when the molding cavity is cooled, and the cooling device is in a state substantially empty of the refrigerant when the molding cavity is heated;
     the heating of the molding cavity by the heating device begins when the base material is inserted into the molding cavity;
     the heating of the molding cavity stops and the cooling of the molding cavity begins when the inner punch advances in the molding cavity and applies compression molding to the heated base material; and
   at the same time that a molded product is discharged from the molding cavity, the refrigerant in the cooling device is drained by gas blowing to establish the substantially empty state, and the substantially empty state is maintained at the time of heating.

2. A molding method comprising:
   providing a molding die including a cooling device disposed inside a molding cavity to feed a refrigerant to mold a base material along a molding face, a heating device disposed around the cooling device, and an inner punch to apply compression molding to a base material pre-fed into the molding cavity; and
   coordinating heating and cooling of the molding cavity with movement of a portion of the molding die and the inner punch to:
     supply, in a first process, the base material to the molding cavity;
     heat, in a second process, the molding cavity and the base material by the heating device disposed around the cooling device, the cooling device being in a state substantially empty of the refrigerant;
     compression mold, in a third process, the heated base material with the inner punch by advancing the inner punch in the molding cavity;
     cool, in a fourth process, the molding cavity by the cooling device disposed inside the molding cavity to harden a molded product after the third process, the cooling device being in a state of containing the refrigerant; and
     extract, in a fifth process, the molded product from the molding cavity at the same time that the refrigerant from the cooling device is drained by gas blowing in the cooling device,
   wherein, in the third process, the heating operation is stopped and switched to the cooling operation.

3. The method according to claim 2, wherein the first to fifth processes form one product molding cycle.

4. The method according to claim 2, wherein the cooling device includes a tubular body.

5. The method according to claim 2, wherein the heating of the molding cavity and the base material by the heating device in the second process is for 2 to 3 seconds.

6. The method according to claim 2, wherein the cooling of the molding cavity by the cooling device in the fourth process is for about 3 seconds.

7. The apparatus according to claim 1, wherein the molding die further comprises an outer punch to restrict a height of the material subjected to compression molding.

8. The apparatus according to claim 1, further comprising an ejection device configured to push the molded product in an upward direction to extract the molded product from the molding cavity.

9. The apparatus according to claim 8, wherein the ejection device is an ejector pin.

10. The method according to claim 2, wherein in the third process, an outer punch restricts the amount of material that is exposed to compression molding by the inner punch.

11. The method according to claim 2, wherein in the fifth process, an ejection device pushes the molded product in an upward direction to extract the product from the molding cavity.

12. The method according to claim 11, wherein the ejection device is an ejector pin.

13. The apparatus according to claim 1, further comprising a warming device for keeping the molding die at a predetermined keeping temperature.

14. The apparatus according to claim 13, wherein,
   the heating device is heating the molding cavity to a compression molding temperature,
   the heating of the molding cavity includes heating the molding cavity from the predetermined keeping temperature to the compression molding temperature, and
   when the heating of the molding cavity stops, the cooling of the molding cavity begins to cool the molding cavity from the compression molding temperature to the predetermined keeping temperature.

15. The apparatus according to claim 1, further comprising a heat insulating panel disposed around a circumference of the molding cavity for thermally separating the molding cavity from the molding die and for reducing the thermal capacity of the molding cavity.

16. The method according to claim 2, wherein the molding die further includes a warming device for keeping the molding die at a predetermined keeping temperature.

17. The method according to claim 16, wherein,
the heating, in the second process, of the molding cavity includes heating the molding cavity from the predetermined keeping temperature to a compression molding temperature, and
the cooling, in the fourth process, includes cooling of the molding cavity from the compression molding temperature to the predetermined keeping temperature.

18. The method according to claim 2, wherein the molding die further includes a heat insulating panel disposed around a circumference of the molding cavity for thermally separating the molding cavity from the molding die and for reducing the thermal capacity of the molding cavity.

* * * * *